United States Patent [19]
Inoue

[11] Patent Number: 6,097,836
[45] Date of Patent: Aug. 1, 2000

[54] IMAGE PROCESSING SYSTEM AND ITS SMOOTHING METHOD FOR CORRECTING COLOR FOG AND BACKLIGHT OF A DIGITAL IMAGE

[75] Inventor: Akira Inoue, Tokyo, Japan

[73] Assignee: NEC Corporation, Tokyo, Japan

[21] Appl. No.: 08/898,132

[22] Filed: Jul. 22, 1997

[30] Foreign Application Priority Data

Jul. 22, 1996 [JP] Japan .................................. 8-191833
Jul. 22, 1996 [JP] Japan .................................. 8-191834

[51] Int. Cl.⁷ .............................. G06K 9/00; G03K 3/08
[52] U.S. Cl. ...................... 382/165; 382/167; 358/518; 358/523
[58] Field of Search ..................... 358/518, 519, 358/520, 521, 523, 524, 525, 534, 1.9, 1.1, 1.3, 1.16; 382/162, 163, 165, 167

[56] References Cited

U.S. PATENT DOCUMENTS

| | | | |
|---|---|---|---|
| 4,956,718 | 9/1990 | Numakura et al. | 358/298 |
| 5,212,560 | 5/1993 | Hattori et al. | 358/518 |
| 5,305,057 | 4/1994 | Hattori et al. | 358/519 |
| 5,694,223 | 12/1997 | Katori et al. | 358/519 |
| 5,715,377 | 2/1998 | Fukushima et al. | 395/109 |
| 5,754,924 | 5/1998 | Yamada | 399/81 |
| 5,764,243 | 6/1998 | Baldwin | 345/506 |

FOREIGN PATENT DOCUMENTS

| | | |
|---|---|---|
| 62-200471 | 9/1987 | Japan . |
| 63-61563 | 3/1988 | Japan . |
| 1-288448 | 11/1989 | Japan . |
| 2-94893 | 4/1990 | Japan . |
| 4-253474 | 9/1992 | Japan . |
| 6-46325 | 2/1994 | Japan . |
| 7-38757 | 2/1995 | Japan . |
| 7-210656 | 8/1995 | Japan . |
| 8-62741 | 3/1996 | Japan . |

*Primary Examiner*—Madeleine Anh-Vinh Nguyen
*Attorney, Agent, or Firm*—Foley & Lardner

[57] ABSTRACT

An image processing system including a correction pattern storing unit for storing correction patterns set corresponding to kinds of color fogs, a correction pattern selecting unit for selecting a correction pattern suitable for correction of input image, a correction amount storing unit for storing a correction amount indicative of an appropriate degree of correction on color fog, a tone curve generating unit for generating a tone curve of RGB based on a selected correction pattern and a correction amount stored in the correction amount storing unit, and an LUT converting unit for performing table conversion on image data of input image according to a generated tone curve to conduct color conversion processing of all the pixels of image data.

6 Claims, 14 Drawing Sheets

FIG. 5

DATA TABLE OF CORRECTION PATTERN STORING UNIT

| ITEM | NAME | hl (Rh,Gh,Bh) | m (Rm,Gm,Bm) | s d (Rs,Gs,Bs) |
|---|---|---|---|---|
| 1 | GREEN FOG IN FLUORESCENT LIGHT | 1,-1,1 | 1,-1,1 | 0,0,0 |
| 2 | YELLOW FOG IN ELECTRIC LIGHT | -1,-1,1 | -1,-1,1 | 0,0,0 |
| 3 | RED FOG IN SNOW SCENE | -1,1,1 | -1,1,1 | 0,0,0 |
| 4 | BLUE FOG IN LIGHT FROM WINDOW FACING NORTH | 0,0,0 | 1,1,-1 | 0,0,-1 |

| LUT 1300 | |
|---|---|
| Y | F(Y) |
| 0 | 0 |
| 1 | 1 |
| 2 | 2 |
| 3 | 3 |
| 4 | 4 |
| . | . |
| . | . |
| . | . |
| 100 | 130 |
| 102 | 132 |
| 102 | 135 |
| . | . |
| . | . |
| . | . |
| 253 | 254 |
| 254 | 255 |
| 255 | 255 | ously # IMAGE PROCESSING SYSTEM AND ITS SMOOTHING METHOD FOR CORRECTING COLOR FOG AND BACKLIGHT OF A DIGITAL IMAGE

BACKGROUND OF THE INVENTION

1. Field of the Invention

The present invention relates to an image processing system for processing digital image data and its image smoothing method, and more particularly, to an image processing system and its smoothing method characterized by the means employed for correcting an input image recorded in a color fog state and in a backlight state.

2. Description of the Related Art

When processing digital image data by use of a computer-based image processing system, various forms of smoothing are performed on the image data as necessary. Hereafter, color fog and backlight correction by use of a conventional image processing systems is described.

First, color fog correction is described. In the color fog correcting method used by conventional image processing systems, the tone curve of the RGB is interactively modified; the operator corrects the colors of an image while confirming the results of his operation.

This conventional method focusing on smoothing the tone curve of the RGB interactively, however, requires too many adjustment parameters for the operator to perform smoothing intuitively, thereby giving rise to a drawback of longer operation time. Furthermore, this method requires experience and skill so that those having no or little experience are unable to perform smoothing as desired.

This type of conventional image processing system for smoothing color is disclosed, for example, in Japanese Patent Laid-Open Publication No. 2-94893, "Image Processing System". The same publication describes a system which allows correction depending on the spectral properties of different types of light source.

The conventional image processing system disclosed in the same publication is described with reference to FIG. 14. In FIG. 14, a spectral properties storing means 1402 stores the amounts of correction to be made for three color components, i.e., red, green, and blue, depending on the spectral properties of different types of light source. A correction amount retrieving means 1403 retrieves the amount of correction for a specified light source from the spectral properties storing means 1402 and inputs it into a color correcting means 1401. The data stored in an input image buffer 1400 is subjected to color correction by the color correcting means 1401 and output to an output image buffer 1404. Assuming that the input pixel values are R, G, and B, and that the output pixel values are R', G', and B', color correction is performed using the following expression (1).

$$R'=R/r0,\ G'=G/g0,\ B'=B/b0 \qquad (1)$$

This correcting method multiplies the RGB value by the constant term.

In the correcting method that simply multiplies the RGB values by the constant term, however, it is impossible to smooth all the colors of respective light sources completely, resulting in the inability to achieve the best possible color through correction. In addition, a color fog state that has been caused by such factors as film, lens, and exposure characteristics, along with color variances among different light sources, is impossible to correct solely based on the properties of different light sources, making this method inadequate for obtaining good correction results.

Next, backlight correction is described. Conventional backlight correcting systems include an automatic exposure control device, for example, a video camera. This type of system controls the diaphragm so as to maintain the level of output signals constant. Means of controlling the diaphragm include the mean value method that obtains the mean value of brightness of an entire screen, the peak value method that detects the maximum value of brightness of a screen, and the method that combines both. A diaphragm control unit, typically located behind a lens system, controls the quantity of incident light to make the screen brighter or darker. This type of conventional backlight correcting system is disclosed, for example, in Japanese Patent Laid-Open Publication No. 6-46325, "Automatic Exposure Control System". The same publication describes a system that estimates the intensity of backlight based on the brightness data for a screen and determines how much the diaphragm should be controlled using the value thus obtained.

The conventional backlight correction device disclosed in the same publication is described with reference to FIG. 15. In FIG. 15, a subject image is formed on an image pickup device 1503 via a lens 1501 and a diaphragm 1502, converted into an electric signal, and output through a signal processing circuit 1505 for performing the γ processing and other tasks. At this time, the diaphragm control is performed by use of a signal from the image pickup device 1503 as follows.

A full screen mean value detecting unit 1507 detects the mean brightness of the full screen. Subsequently, the diaphragm control unit 1506 determines the diaphragm aperture so as to achieve a target brightness. A smaller region mean value detecting unit 1508 divides a screen into smaller regions and calculates the mean value of each block. A low brightness mean value calculating unit 1509 arranges in the order of brightness the mean values of brightness of respective small regions calculated by the smaller region mean value detecting unit 1508, and selects a predetermined number of small regions sequentially from the small region of the lowest brightness, and calculates the mean brightness of the regions thus selected. A backlight degree calculating unit 1511 calculates the degree of backlight from the mean brightness of the several selected regions calculated by the low brightness mean value calculating unit 1509. A target brightness calculating unit 1510 modifies the target aperture so as to enlarge the diaphragm aperture when the degree of the backlight calculated by the backlight degree calculating unit 1511 becomes larger, and modifies the target aperture so as to reduce the diaphragm aperture when the degree of the backlight becomes smaller.

In conventional backlight correcting systems, backlight is corrected by adjusting the diaphragm aperture so as to enter the greater quantity of light or the smaller quantity of light. This aims to control the device, a video camera or the like, directly. The similar correcting method cannot be used for the data once quantized and stored as a digital image.

Considering diaphragm control as image processing, γ correction conversion as illustrated in FIG. 16 is the closest conversion to backlight correction through the above-mentioned modification of the diaphragm aperture. When diaphragm is not changed, the input value of brightness is the same as the output value of brightness, as illustrated in the conversion characteristic 1603. An enlarged diaphragm aperture has characteristic as illustrated in the conversion characteristic 1601 for a large aperture and a reduced diaphragm aperture has the characteristic as illustrated in the conversion characteristic 1602 for a small aperture.

Since the range of partial light quantities in the scenery of the natural environment is being recorded by a video camera, the brightness value in the shadow region (the darkest region in the image) will not be increased uniformly when the diaphragm is enlarged; instead, more information on the shadow region is recorded as contrast intensifies. In the case of image data, however, since brightness information on the shadow region has already been quantized and compressed, γ correction would not increase the brightness information on the shadow region. In other words, the shadow region becomes brighter uniformly to an excessive level.

In a video camera, the value of the quantity of light in the backlight portion is always near "0". In an image data input from a color photographic film through a scanner, the value of the light quantity in the backlight portion does not always represent the pixel value near "0". For a photography printed with the backlight portion slightly brighter, the backlight portion is in the vicinity of, for example, the pixel value "30". With reference to FIG. 16, an input backlight unit 1604 corresponds to the backlight portion. Through the γ correction for the image data, the brightness value of the backlight portion is converted into an output backlight portion 1605. As illustrated in FIG. 16, the range of the output backlight portion 1605 in this case is narrower than the range of the input backlight portion 1604. In other words, although the backlight portion in the image becomes brighter, the range of the brightness becomes narrower, thereby deteriorating the contrast condition and consequently the image quality.

The conventional backlight correction technique for digital image data, although it simulates the diaphragm control by a camera through the γ correction for the data, is actually incapable of performing a good backlight correction in the correction of the digital data.

SUMMARY OF THE INVENTION

One objective of the present invention is to provide an image processing system capable of easily executing such complicated correction operations as correction according to the light source colors and correction of a snowy scenery.

Another objective of the present invention is to provide an image processing system capable of reducing time required for operation and consequently reducing manhours through increased efficiency as well as allowing any operator to obtain desired correction results, regardless of the level of skill and experience.

One more objective of the present invention is to provide an image processing system capable of correcting backlight without decreasing the contrast by giving the characteristic of correction to a greater brightness the medial pixels brighter than the shadow region.

According to the first aspect of the invention, an image processing system which conducts necessary correction processing on digital image data, comprises correction pattern storing means for storing correction patterns set corresponding to kinds of color fogs, correction pattern selecting means for selecting the correction pattern suitable for correction of input image among the correction patterns stored in the correction pattern storing means through the operation of an operator, correction amount storing means for storing a correction amount indicative of an appropriate degree of correction on color fog, tone curve generating means for generating a tone curve of RGB based on the correction pattern selected by the correction pattern selecting means and the correction amount stored in the correction amount storing means, and LUT converting means for performing table conversion on image data of the input image based on the tone curve generated by the tone curve generating means to conduct color conversion processing of all the pixels of the image data.

The image processing system may further comprise correction amount specifying means for specifying a correction amount to be stored in the correction amount storing means according to each correction processing by the operation of an operator.

The tone curve generating means may comprise highlight control amount calculating means for calculating a control amount of a highlight region in each component of RGB based on the correction pattern and the correction amount, half tone control amount calculating means for calculating a control amount of a half tone region in each component of RGB based on the correction pattern and the correction amount, shadow control amount calculating means for calculating a control amount of a shadow region in each component of RGB based on the correction pattern and the correction amount, tone curve calculating means for calculating the tone curve of each component of RGB based on the three kinds of control amounts calculated by the three kinds of control amount calculating means, a straight line generating module for use in the tone curve calculating processing by the tone curve calculating means to conduct straight line interpolation between a control point in a high brightness region and a control point in a low brightness region, and a curve generating means for use in the tone curve calculating processing by the tone curve calculating means to conduct curve interpolation for smoothly interpolating between a control point in a half tone region and starting points on the high brightness side and the low brightness side.

According to the second aspect of the invention, digital image data correcting method in an image processing system which conducts necessary correction processing on digital image data, comprises the steps of among correction patterns set corresponding to kinds of color fogs, selecting the correction pattern suitable for correction of input image by the operation of an operator, obtaining a correction amount indicative of an appropriate degree of correction on color fog, generating a tone curve of RGB based on the correction pattern selected at the correction pattern selecting step and the correction amount obtained at the correction amount obtaining step, and performing table conversion on image data of the input image according to the tone curve generated at the tone curve generating step to conduct color conversion of all pixels of the image data.

The tone curve generating step comprises the steps of calculating a control amount of a highlight region in each component of RGB based on the correction pattern and the correction amount, calculating a control amount of a half tone region in each component of RGB based on the correction pattern and the correction amount, calculating a control amount of a shadow region in each component of RGB based on the correction pattern and the correction amount, and calculating the tone curve of each component of RGB based on the three kinds of control amounts calculated at each the steps, wherein at the time of calculating a tone curve, the tone curve calculating step performing a straight line generating module for conducting straight line interpolation between a control point in a high brightness region and a control point in a low brightness region, and a curve generating module for conducting curve interpolation for smoothly interpolating between a control point in a half tone region and starting points on the high brightness side and on the low brightness side.

According to the third aspect of the invention, a computer readable memory which stores an image processing program for controlling an image processing system which conducts necessary correction processing on digital image data, the image processing program comprises the steps of among correction patterns set corresponding to kinds of color fogs, selecting the correction pattern suitable for correction of input image by the operation of an operator, obtaining a correction amount indicative of an appropriate degree of correction on color fog, generating a tone curve of RGB based on the correction pattern selected at the correction pattern selecting step and the correction amount obtained at the correction amount obtaining step, and performing table conversion on image data of the input image according to the tone curve generated at the tone curve generating step to conduct color conversion of all pixels of the image data According to the fourth aspect of the invention, an image processing system which conducts calculating, from an RGB value of a pixel, a brightness value of the pixel, wherein the shadow region brightness value extracting means causes the RGB brightness value converting means to extract a shadow region brightness value of a desired low brightness pixel.

The backlight correction table generating means may comprise parameter calculating means for calculating a parameter for use in correction based on the backlight correction amount stored in the backlight correction amount storing means, first conversion table generating means for generating a conversion table by using the parameter calculated by the parameter calculating means, and second conversion table generating means for generating the backlight correction table based on the conversion table generated by the first conversion table generating means and the shadow region brightness value extracted by the shadow region brightness value extracting means, the parameter calculating means calculating spline control point coordinates based on the backlight correction amount, and the first conversion table generating means calculating a spline curve based on the spline control point coordinates.

The backlight correction table generating means may comprise parameter calculating means for calculating a parameter for use in correction based on the backlight correction amount stored in the backlight correction amount storing means, first conversion table generating means for generating a conversion table by using the parameter calculated by the parameter calculating means, and second conversion table generating means for generating the backlight correction table based on the conversion table generated by the first conversion table generating means and the shadow region brightness value extracted by the shadow region brightness value extracting means, the second conversion table generating means may include backlight correction characteristics calculating means for calculating, with reference to a brightness value of a pixel in image data of input image, the shadow region brightness value, and the conversion table generated by the first conversion table generating means, a brightness value of the pixel obtained after backlight correction, and brightness value comparing means for comparing a brightness value of each pixel in image data of input image with the shadow region brightness value, and when the brightness value of the target pixel is lower than the shadow region brightness value, taking the brightness value of the target pixel as a brightness value to be obtained after the correction and when the brightness value of the target pixel is higher than the shadow region brightness value, activating the backlight correction characteristics calculating means to calculate a brightness value to be obtained after the correction.

According to the fifth aspect of the invention, a digital image data correcting method in an image processing system which conducts necessary correction processing on digital image data, comprises the steps of extracting a shadow region brightness value which is a brightness value of a low brightness pixel from image data of input image, obtaining a backlight correction amount indicative of an appropriate degree of correction on backlight input image, generating a backlight correction table characterized by, based on the shadow region brightness value extracted at the shadow region brightness value extracting step and the backlight correction amount obtained at the backlight correction amount obtaining step, not correcting a pixel whose brightness value falls in the range between "0" and the shadow region brightness value and correcting a pixel whose brightness value is higher than the shadow region brightness value so as to increase the brightness value, and necessary correction processing on digital image data, comprises shadow region brightness value extracting means for extracting a shadow region brightness value which is a brightness value of a low brightness pixel from image data of input image, backlight correction amount storing means for storing a backlight correction amount indicative of an appropriate degree of correction on backlight input image, backlight correction table generating means for generating a backlight correction table characterized by, based on the shadow region brightness value extracted by the shadow region brightness value extracting means and the backlight correction amount stored in the backlight correction amount storing means, not correcting a pixel whose brightness value falls in the range between "0", and the shadow region brightness value and correcting a pixel whose brightness value is higher than the shadow region brightness value so as to increase the brightness value, and LUT converting means for performing table conversion on image data of the input image based on the backlight correction table generated by the backlight correction table generating means to conduct color conversion processing of all pixels of the image data.

The image processing system may further comprise RGB brightness value converting means for performing table conversion on image data of the input image based on the backlight correction table generated at the backlight correction table generating step to conduct color conversion processing of all the pixels of the image data.

The backlight correction table generating step comprises the steps of calculating a parameter for use in correction based on the backlight correction amount stored in the backlight correction amount storing means, generating a conversion table by using the parameter calculated at the parameter calculating step, and generating the backlight correction table based on the conversion table generated at the conversion table generating step and the shadow region brightness value extracted by the shadow region brightness value extracting means, the step of generating a backlight correction table based on the conversion table include the steps of comparing a brightness value of each pixel in image data of input image with the shadow region brightness value, determining a brightness value of the target pixel as a brightness value to be obtained after the correction when the brightness value of the target pixel is lower than the shadow region brightness value, and calculating a brightness value of a target pixel to be obtained after the backlight correction with reference to the brightness value of the target pixel, the shadow region brightness value, and the conversion table generated at the conversion table generating step when the brightness value of the target pixel is higher than the shadow region brightness value.

According to the sixth aspect of the invention, a computer readable memory which stores an image processing program for controlling an image processing system which conducts necessary correction processing on digital image data, the image processing program comprises the steps of extracting a shadow region brightness value which is a brightness value of a low brightness pixel from image data of input image, obtaining a backlight correction amount indicative of an appropriate degree of correction on backlight input image, generating a backlight correction table characterized by, based on the shadow region brightness value extracted at the shadow region brightness value extracting step and the backlight correction amount obtained at the backlight correction amount obtaining step, not correcting a pixel whose brightness value falls in the range between "0" and the shadow region brightness value and correcting a pixel whose brightness value is higher than the shadow region brightness value so as to increase the brightness value, and performing table conversion on image data of the input image based on the backlight correction table generated at the backlight correction table generating step to conduct color conversion processing of all the pixels of the image data.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is a view showing a data example of a correction pattern storing unit of the embodiment.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

A principal of color fog correction in an image, according to the present invention, is described first.

Figure 3:
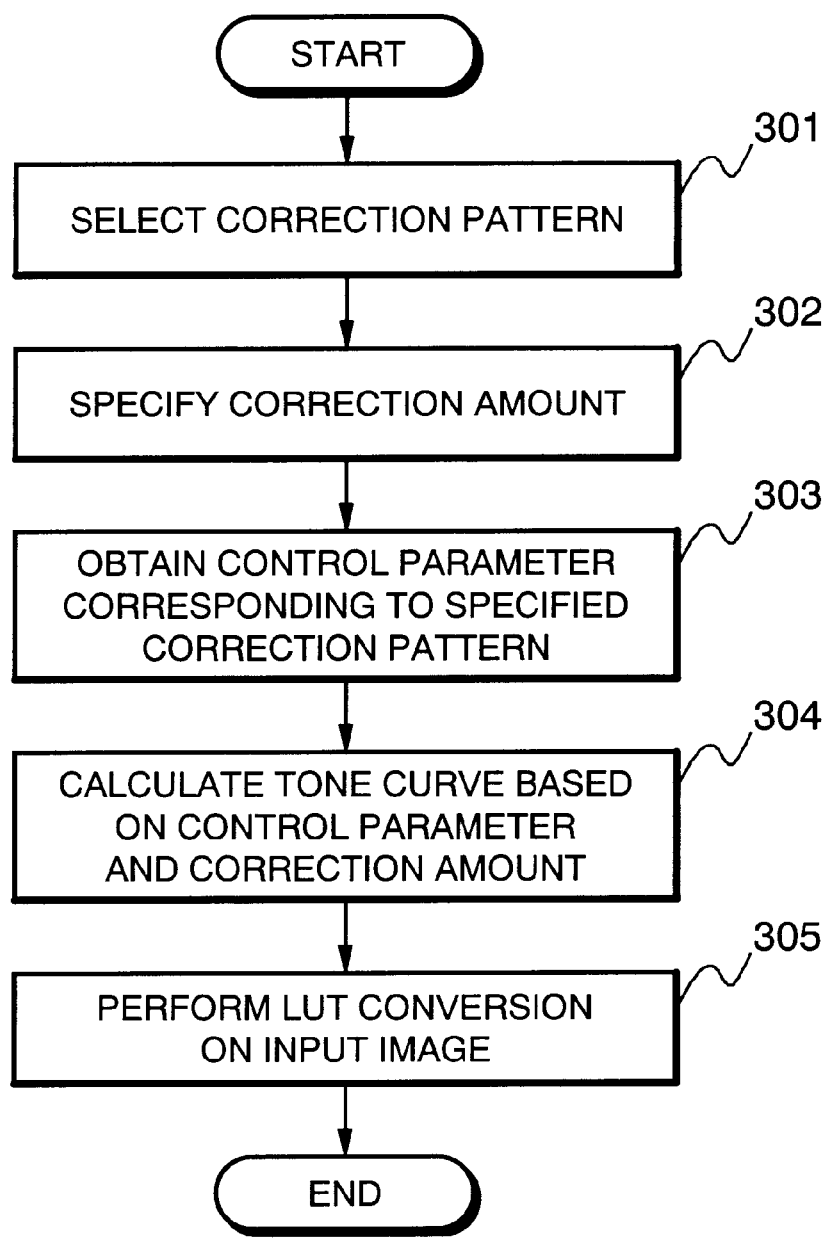
FIG. 3 is a flow chart showing a flow of the processing in the color fog correcting method of the embodiment.

With reference to FIG. 3 showing a flow of the processing in correction of color fog of an image according to the present invention, the operator first confirms an input image by a monitor or the like, and selects one pattern to be executed from the correction patterns prepared beforehand (Step 301).

There are several patterns in the unfavorable color condition of an image, including green fog in a fluorescent light, yellow fog in an electric light, red fog in a snow scene, and blue fog by light coming through a window facing north. These are caused not only by the type of the light source but also by the characteristics of the photographic film used and the CCD. The present invention holds tone curve control parameters for each of these unfavorable patterns. Correction pattern selected in Step 301 means the combination of these control parameters.

Next, the operator determines the extent of correction by specifying the amount of correction (Step 302). After a control parameter for the same correction pattern is obtained (Step 303), the RGB tone curve is calculated on the basis of the control parameter and the correction amount (Step 304), and color conversion processing on an input image data on the basis of the tone curve data thus obtained is performed (Step 305).

FIG. 5 shows an example of the correction pattern mentioned above. In a data table 501 for correction patterns as illustrated, each item of the unfavorable pattern such as green fog in a fluorescent light and its corresponding tone curve control parameter 502 for correcting the unfavorable condition are registered. The tone curve control parameter 502 includes data on highlight (hl), half tone (m), shadow (sd), as illustrated in FIG. 5. Each piece of data has three RGB control parameters 503. For example, "hl" is represented by the combination of (Rh, Gh, Bh).

An example of tone curve control by the use of highlight, half tone, and shadow as parameters is described with reference to FIG. 4. A tone curve is controlled by the specified correction amount (grad) and parameters (hl), (m), (sd).

Figure 4:
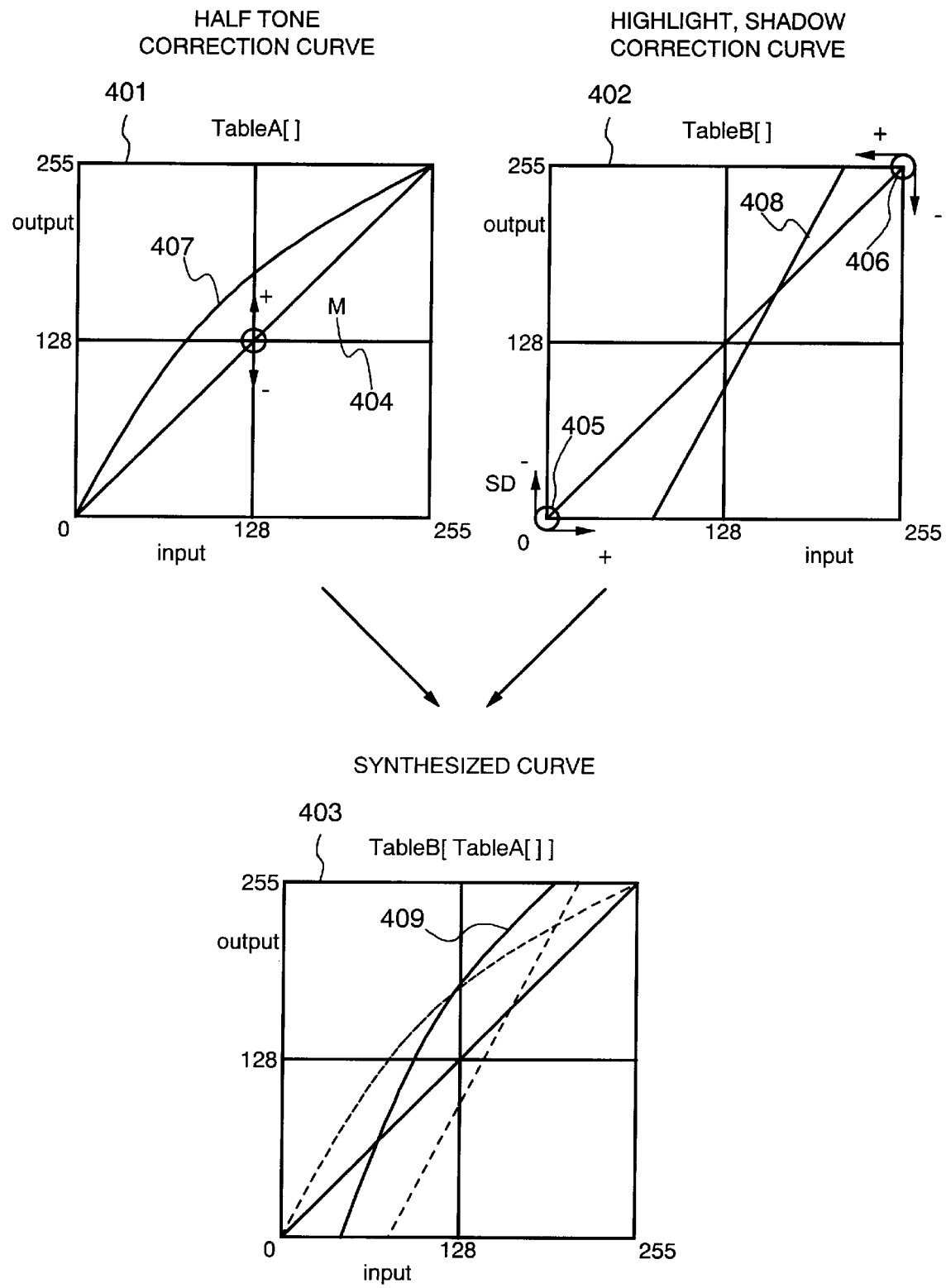
FIG. 4 is a schematic view for use in describing generation processing of a color fog correction table according to the embodiment.

In the example shown in FIG. 4, the M control point 404 is controlled by the data of half tone (m) and (grad), and used for generating a half tone correction curve 401. The HL control point 406 is controlled by the data of the highlight (hl) and (grad) and the SD control point 405 is controlled by the data of the shadow (sd) and (grad). The HL control point 406 and the SD control point 405 are used to generate a highlight shadow correction curve 402.

In the half tone correction curve 401, the M control point 404 on the tone curve moves upward when the correction amount of the half tone is "+", and it moves downward when it is "−". An interpolation curve interpolates smoothly between the starting point (0,0) of the tone curve on the side of low brightness, the M control point 404, and the starting point (255, 255) of the tone curve on the side of high brightness, thereby generating a tone curve.

In the highlight shadow correction curve 402, when the highlight correction amount and the shadow correction amount are "+" or "−", the HL control point 406 and the SD control point 405 move as illustrated. A straight line interpolates between the HL control point 406 and the SD control point 405.

As a result, the half tone correction curve 401 is synthesized with the highlight shadow correction curve 402, generating a synthetic curve 403. The above-mentioned processing is performed on the tone curve of every RGB by use of the RGB control parameter 503 illustrated in FIG. 5.

Figure 1:
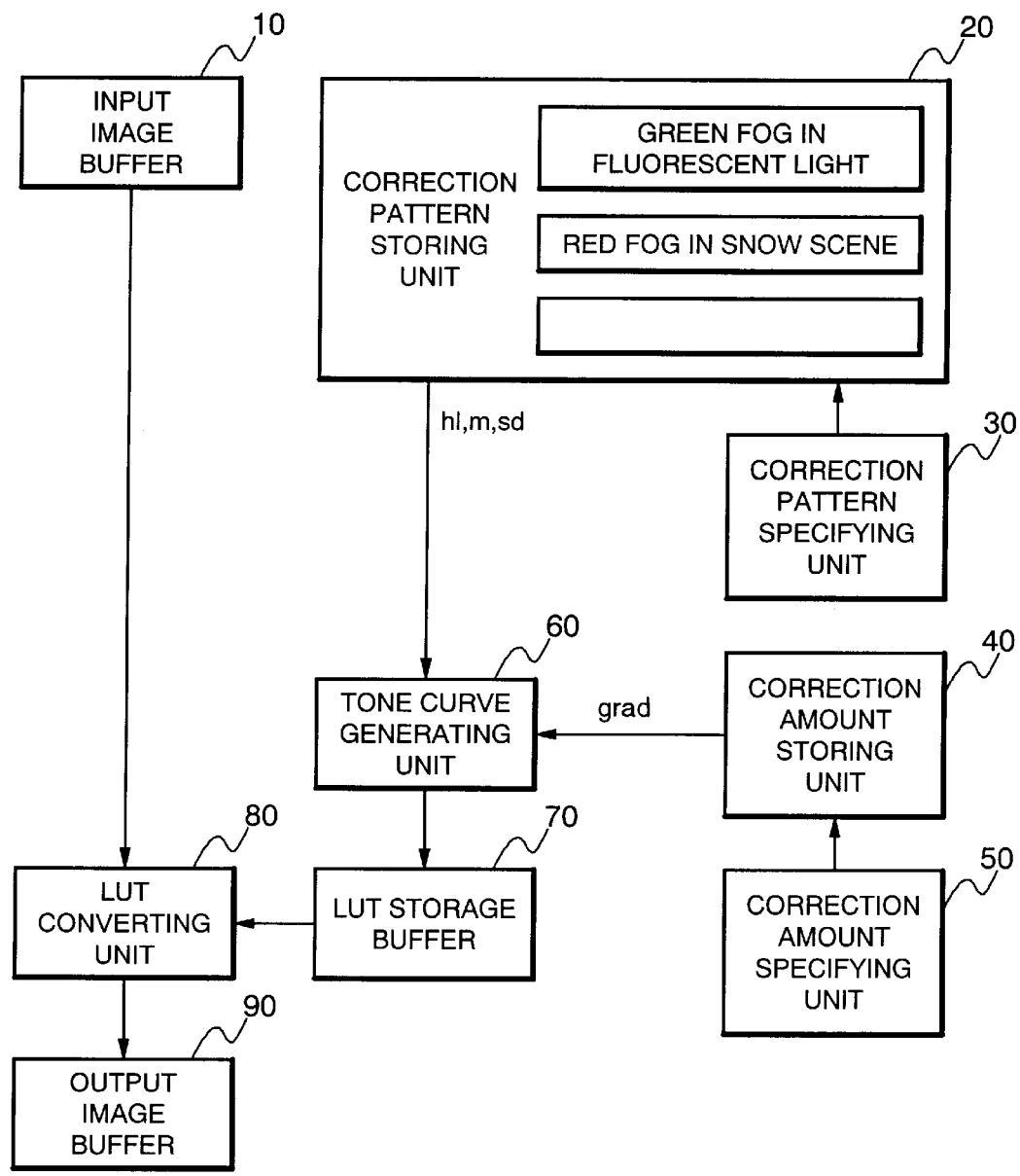
FIG. 1 is a block diagram showing a constitution of an image processing system according to an embodiment of the present invention.

FIG. 1 is a block diagram showing a constitution of an image processing system for realizing the above-mentioned color fog correction.

With reference to FIG. 1, the image processing system of the embodiment includes an input image buffer 10 for holding input image data, a correction pattern storing unit 20 for storing correction patterns for correcting color fog in an input image, a correction pattern specifying unit 30 for an operator to specify the correction pattern, a correction amount storing unit 40 for storing the correction amount of color fog, a correction amount specifying unit 50 for an operator to specify the correction amount, a tone curve generating unit 60 for generating the tone curve data of RGB on the basis of the data stored in the correction pattern storing unit 20 and the correction amount stored in the correction amount storing unit 40, an LUT storage buffer 70 for storing the generated tone curve data, an LUT converting unit 80 for performing a table conversion on the image data, and an output image buffer 90 for holding output data. FIG. 1 shows the characteristic components of the embodiment only, and the other general components are not shown therein. It is needless to say that the system includes further components for executing other smoothing operations, including backlight correction to be described herein later, and other components for executing other processing.

Figure 2:
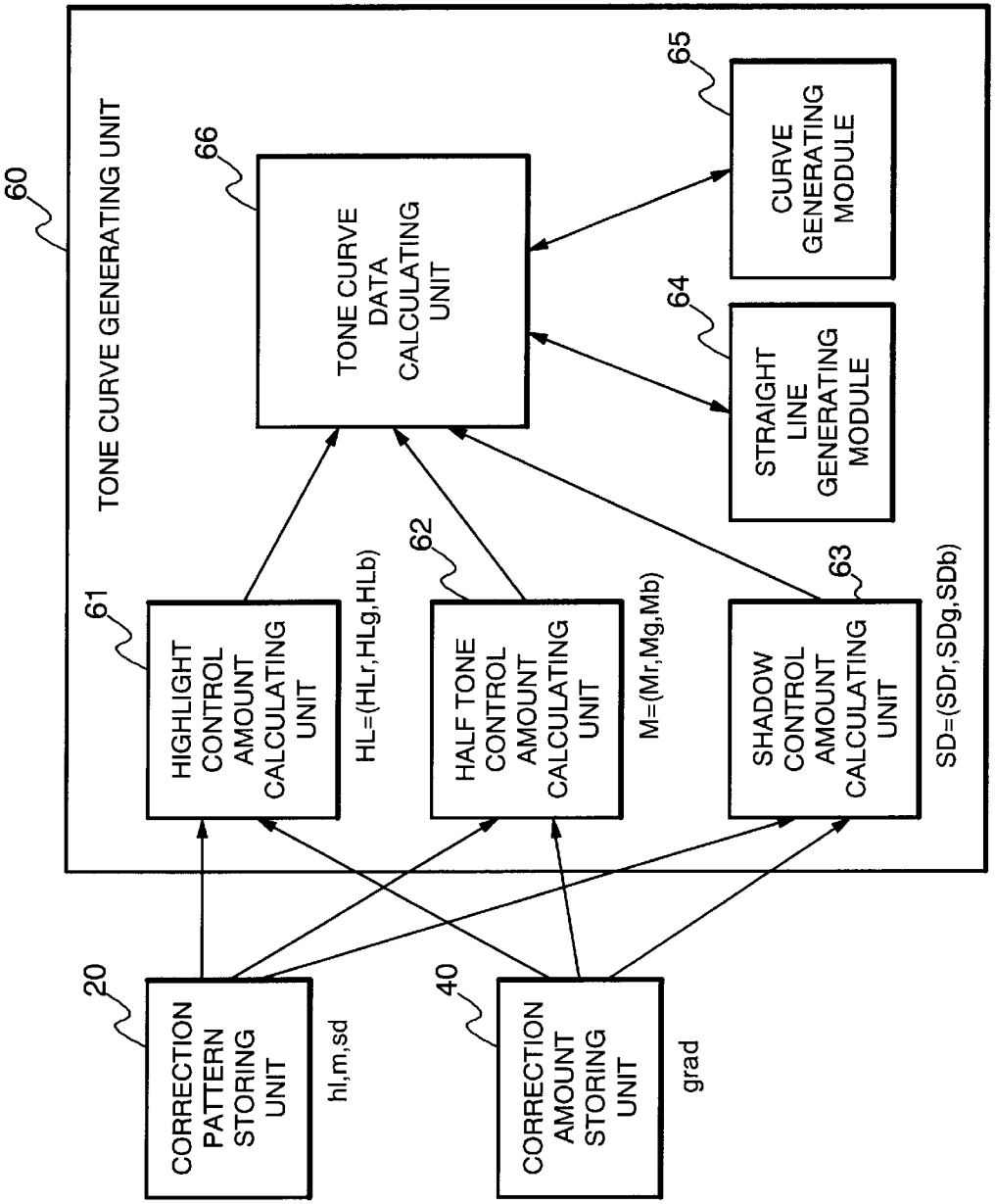
FIG. 2 is a block diagram showing a constitution of a tone curve generating unit of the present embodiment.

FIG. 2 is a block diagram showing a constitution of a tone curve generating unit 60. As illustrated in FIG. 2, the tone curve generating unit 60 includes a highlight correction amount calculating unit 61 for calculating the correction amount in each highlight region of the RGB on the basis of the data stored in the correction pattern storing unit 20 and the correction amount stored in the correction amount storing unit 40, a half tone correction amount calculating unit 62 for calculating the correction amount of each half tone region of the RGB, a shadow correction amount calculating unit 63 for calculating the correction amount of each shadow region of RGB, a tone curve data calculating unit 66 for calculating the tone curve data on the basis of the above-mentioned three correction amounts, a straight line generating module 64, and a curve generating module 65.

In thus constituted image processing system, the operator first selects a correction pattern to be adopted to an image of the input image buffer 10 by the correction pattern specifying unit 30, and inputs an appropriate color fog correction amount into the correction amount storing unit 40 by use of the correction amount specifying unit 50. As for the color fog correction amount, a predetermined value may be held in the correction amount storing unit 40 beforehand.

Figure 6:
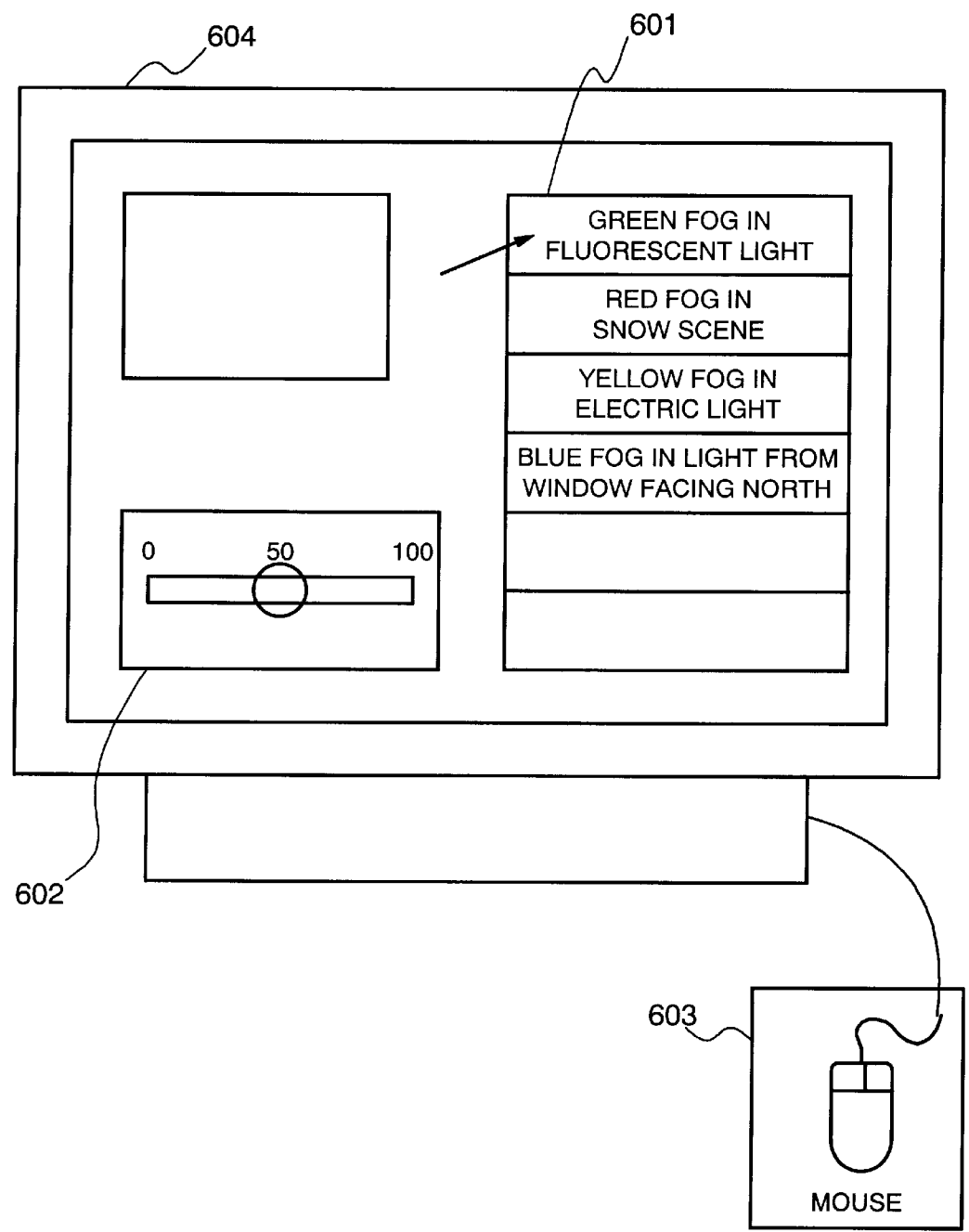
FIG. 6 is a schematic view showing a constitution example of a correction parameter specifying device for use in the embodiment.

The correction pattern specifying unit 30 includes, for example, a monitor for displaying an image, and an interface for selecting the correction pattern with a mouse or other pointing device. FIG. 6 shows a constitutional example for realizing the correction pattern specifying unit 30 and the correction amount specifying unit 50. The correction pattern specifying means 601 displayed on the CRT monitor 604 shows the items such as green fog in a fluorescent light, yellow fog in an electric light, red fog in a snow scene, and blue fog in a light from a window facing north. The operator specifies a desired correction pattern by operating a mouse 603. The correction amount specifying means 602 also displayed on the CRT monitor 604 shows a slider bar for specifying the extent of correction. The operator specifies a desired correction amount by operating the mouse 603.

The tone curve generating unit 60 obtains the tone curve data of the corrected pattern specified by the operator through the above mentioned correction pattern specifying unit 30, from correction pattern storing unit 20, and similarly further obtains the correction amount specified by the operator through the correction amount specifying unit 50, from the correction amount storing unit 40, thereby calculating the tone curve data of the RGB by combining these data. The calculated tone curve data is supplied to the LUT storing buffer 70.

Hereafter, the calculating processing of the tone curve data by the tone curve generating unit 60 is described in detail, using the case in which the data illustrated in FIG. 5 are used as control parameters as an example. In this description, it is assumed that the selection of a correction pattern (Step 301 in FIG. 3) and specification of the correction amount (Step 302) have already been completed by the operator.

The highlight correction amount calculating unit 61 first obtains the highlight control parameter hl as the control parameter from the correction pattern storing unit 20. The control parameter hl is held in the format of the RGB control parameter 503, and defined as (Rh, Gh, Bh) (Step 303). Next, the unit 61 obtains the correction amount (grad) from the correction amount storing unit 40. The highlight correction amount is calculated on the basis of the correction amount (grad) and the control parameter hl. The highlight correction amount HL=(HLr,HLg,HLb) is obtained by the following expressions (2), (3), and (4).

$$HLr = Rh \times (grad) \quad (2)$$

$$HLg = Gh \times (grad) \quad (3)$$

$$HLb = Bh \times (grad) \quad (4)$$

Similarly, the half tone correction amount calculating unit 62 calculates the half tone correction amount. Assuming that the half tone parameter m is (Rm, Gm, Bm), the half tone correction amount M=(Mr, Mg, Mb) can be obtained by the following expressions (5), (6), and (7).

$$Mr = Rm \times (grad) \quad (5)$$

$$Mg = Gm \times (grad) \quad (6)$$

$$Mb = Bm \times (grad) \quad (7)$$

The shadow correction amount calculating unit 63 calculates the shadow correction amount. Assuming that the shadow parameter sd is (Rs, Gs, Bs), the shadow correction amount SD=(SDr, SDg, SDb) is obtained by the following expressions (8), (9), and (10).

$$SDr = Rs \times (grad) \quad (8)$$

$$SDg = Gs \times (grad) \quad (9)$$

$$SDb = Bs \times (grad) \quad (10)$$

That is to say, each correction amount per unit correction amount is written in the correction pattern storing unit 20, and the flexibility in correction is enhanced by multiplying the unit correction amount by the data stored in the correction amount storing unit 40 at each correction amount calculating unit.

Next, the tone curve data calculating unit 66 calculates the tone curve data on the basis of the above-mentioned three correction amounts (Step 304). An example of the tone curve data calculation is illustrated in FIG. 4. Here, the RGB data are defined as 8 bits and the pixel value is defined as the value in the range of 0 to 255. The starting point of the tone curve on the side of low brightness is (0, 0), and the starting point of the tone curve on the side of high brightness is (255, 255)

First, the half tone correction curve 401 is calculated on the basis of the half tone correction amount M. The M correction point 404 is the half point in the middle of the brightness of the tone curve. In the example of FIG. 4, the M control point 404 is defined as (128, 128). When the half tone correction amount M is "+", the M control point 404 moves upward, and when it is "−", it moves downward.

An example of the movement of the M control point 404 is described hereafter. Assuming that the R component of the half tone correction amount M is Mr, the M control point 404 of the R tone curve moves from (128, 128) to (128, 128+Mr). More specifically, when Mr=100, the M control point 404 on the R tone curve moves from (128, 128) to (128, 228). Similarly, the M control point 404 on the G tone curve and B tone curve moves respectively for each component of the correction amount.

As a result, when the half tone correction amount is "+", the tone curve of each RGB component becomes a curve expanded upward as illustrated in the conversion characteristic 36. In the actual calculation, the curve generating module 65 is activated, to generate a curve by curve interpolation such as spline interpolation or other interpolation for the point (0, 0), the M control point 404, and the point (255, 255). The only requirement here is that the starting points (0, 0) and the point (255, 255) on the tone curve and the M control point 404 are smoothly connected by the curve interpolation and any interpolation function can be used for the curve interpolation.

Next, the highlight shadow correction curve 402 is calculated on the basis of the highlight correction amount HL and the shadow correction amount SD. The HL control point 406 is the control point positioned on the higher brightness side of the tone curve. When the highlight correction amount HL is "+", it is assumed that the HL control point 406 moves from (255, 255) towards (0, 255). When the highlight correction amount HL is "−", it is assumed that the HL control point 406 moves from (255, 255) towards (255, 0). The SD control point 405 is the control point positioned on the lower brightness side of the tone curve. When the shadow correction amount SD is "+", it is assumed that the SD control point 405 moves from (0, 0) towards (255, 0). When the shadow correction amount SD is "−", it is assumed that the SD control point 405 moves from (0, 0) towards (0, 255).

An example of the movement of the SD control point 405 and the HL control point 406 is described hereafter. Assuming that the R component of the shadow correction amount SD is SDr, when SDr>0, the SD control point 405 on the R tone curve moves from (0, 0) to (SDr, 0). When SDr<0, the SD control point 405 on the R tone curve moves from (0, 0) to (0, −SDr). Assuming that the R component of the highlight correction amount HL is HLr, when HLr>0, the HL control point 406 on the R tone curve moves from (255, 255) to (255−HLr, 255). When HLr<0, the HL control point 406 on the R tone curve moves from (255, 255) to (255, 255+HLr). The SD control point 405 and the HL control point 406 on the G tone curve and B tone curve are moved similarly.

The straight line generating module 64 is activated to obtain a highlight/shadow correction curve 402 for the control points set as mentioned above by the straight line interpolation.

The tone curve data calculating unit 66 then synthesizes the two tables generated as mentioned above. Assuming that the half tone correction curve 401 is stored in the Table A[], and the highlight/shadow correction curve 402 is stored in the Table B[], the synthesized curve 403 can be obtained using the following expression (11).

$$\text{Table}[i] = \text{TableB}[\text{TableA}[i]] \quad (i = 0, 1, 2, \ldots 255) \tag{11}$$

The conversion characteristic 409 is shown in FIG. 4 as an example of combined curve. The synthesized curve 403 is calculated separately for each RGB. The synthesized curve 403 obtained by calculation is output to the LUT storing buffer 70 as the tone curve data for RGB.

After the table of the tone curve data thus created is stored in the LUT storing buffer 70, the LUT conversion unit 80 reads the RGB image data sequentially from the input image buffer 10, and performs the conversion on the data of each component of the RGB with reference to the table of the corresponding component stored in the LUT storing buffer 70 (Step 305). The values of the data after the table conversion are stored in the output image buffer 90.

As described above, the color fog correction processing by the image processing system of the present invention enables complicated smoothing that has been difficult so far, such as smoothing according to the light source color and smoothing in a snow scene, by preparing the correction patterns in accordance with the various unfavorable conditions of an image and performing data correction by table conversion.

Further, it can perform correction for the color fog caused by not only color variances of the light source but also the film sensitivity and the exposure processing, by registering proper correction patterns.

Color fog correction by the image processing system of the present invention adopts such an intuitive specifying method that proper smoothing can be made by only specifying a correction pattern and a correction amount, not requiring many adjustment parameters. As a result, the operation's time requirements are reduced, thereby enhancing efficiency and reducing operator manhours. In addition, the system provides the advantage that the operation does not require skill and experience, thus allowing even a less-experienced operator to perform smoothing as desired.

Next, the principle of the backlight correction according to the present invention is described.

Figure 10:
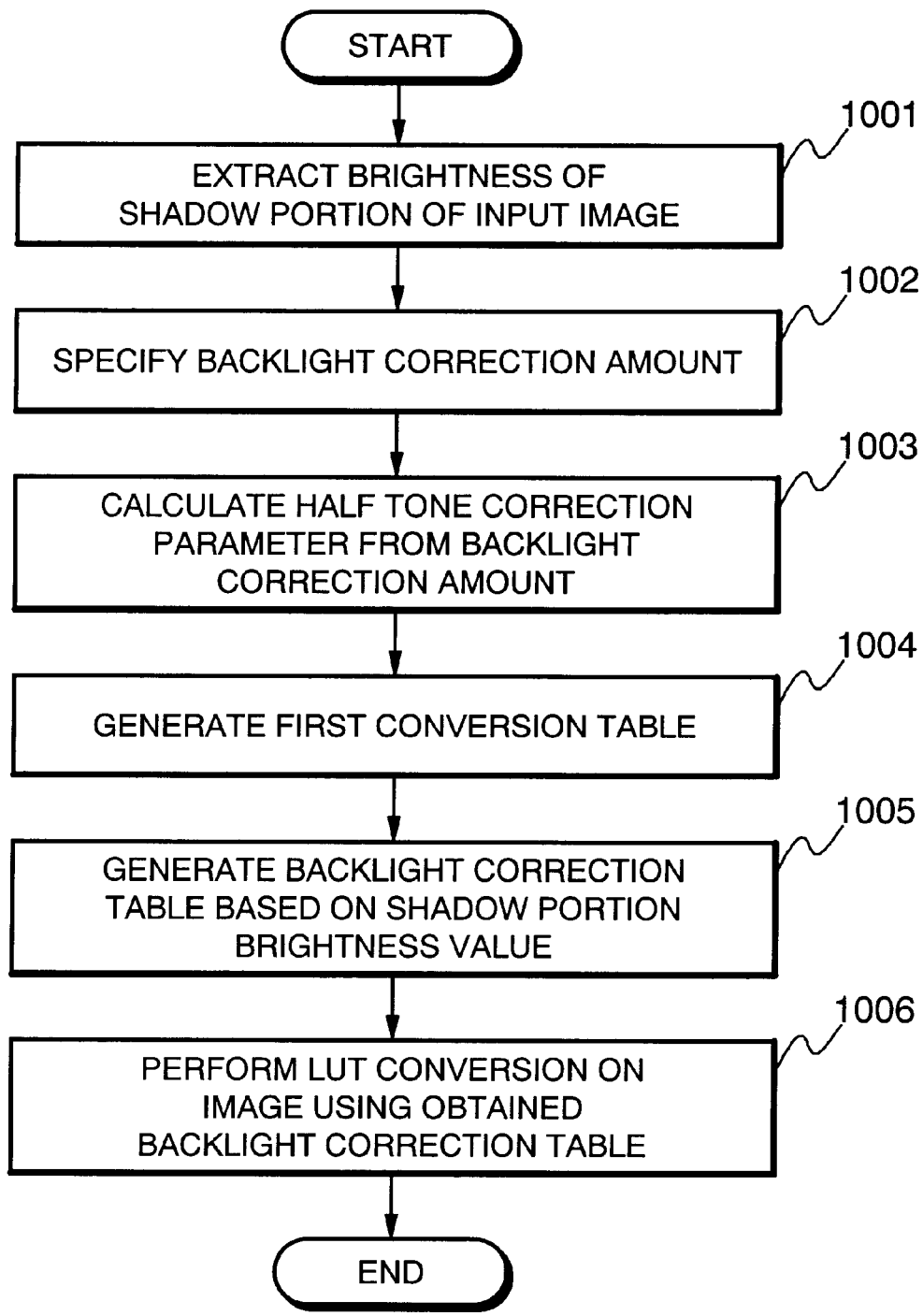
FIG. 10 is a flow chart showing a flow of the processing in a backlight correction method according to the embodiment.

With reference to FIG. 10 showing a flow of the processing of the backlight correction according to the present invention, the lower brightness portion is first extracted from an input image on the screen and its brightness is stored as the shadow brightness value (Step 1001).

In order to extract the shadow brightness value, a histogram of the brightness is created. The brightness herein means the numerical value showing the brightness of the RGB pixel. One method of obtaining the brightness from the RGB value is to use the Y value of the CIE-XYZ value. More specifically, assuming that the RGB value is the NTSC signal, the Y value can be obtained by the following expression (12).

$$Y = 0.299 \times R + 0.287 \times G + 0.114 \times B \tag{12}$$

Additionally, such values of the average value of R, G, and B, or the maximum value of R, G, and B may be adopted as the brightness Y of its pixel.

A histogram is obtained by scanning the image data from the end and incrementing the value of the array hist[Y] at the brightness Y value. Alternatively, in order to shorten the processing time, a histogram may be created by searching for the pixels in appropriate intervals, for example, every several pixels, instead of searching for all. In reference to the low brightness area of the created histogram, the pixel value of the low brightness pixel of the image is extracted and defined as the brightness value of the shadow region. In addition, assuming, for example, that the number of pixels equaling of all the pixels is Na, the brightness value of the pixel having the Na-th lowest brightness value may be adopted as the brightness value of the shadow region.

Next, the operator specifies the backlight correction amount (Step 1002). The half tone correction parameter is calculated from the specified backlight correction amount (Step 1003). Examples of the half tone control parameters include the γ values and n control points on the spline curve. Alternatively, an appropriate value may be stored in the system in advance as the backlight correction amount and use it when calculating the half tone correction parameter.

Figure 11:
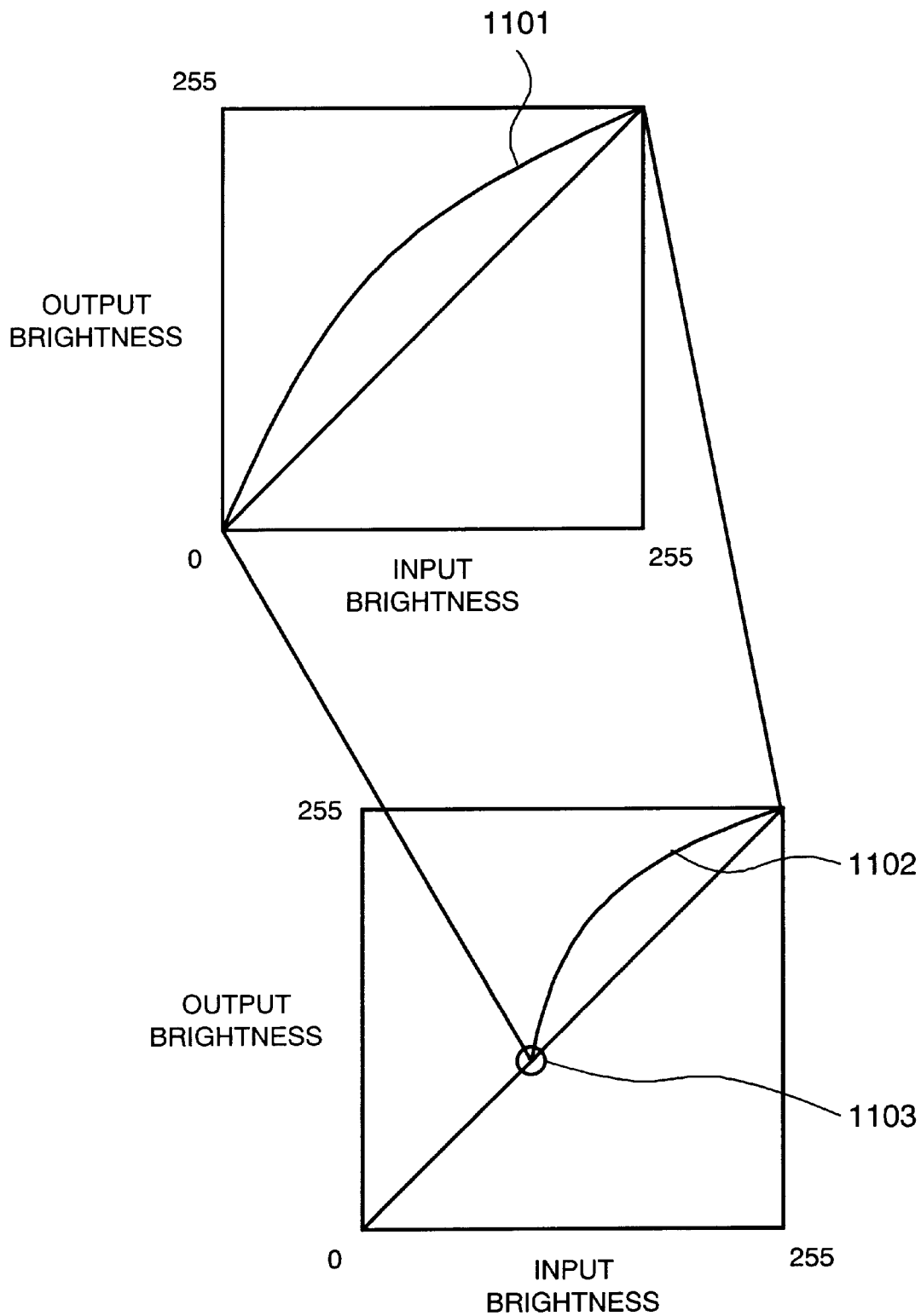
FIG. 11 is a schematic view for use in describing the processing for generating a backlight correction table from a first conversion table according to the embodiment.

Next, the half tone parameter thus calculated is used to generate the first conversion table for use in correcting backlight (Step 1004). Here, the first conversion table is described. FIG. 11 shows an example of the first conversion table. The characteristic 40 of the first conversion table as shown in FIG. 11 is a γ correction curve that uses the γ value as the half tone parameter, and is expressed by the following expression.

$$Y' = c \times Y^{\gamma} \tag{13}$$

This characteristic curve has a conversion characteristic that increases the brightness in the half tone region. The coefficient c is a constant that is determined by the range of brightness to be input. Since backlight correction requires an increase in the value of the brightness in the half region, the γ value here is always less than "1.0".

Figure 9:
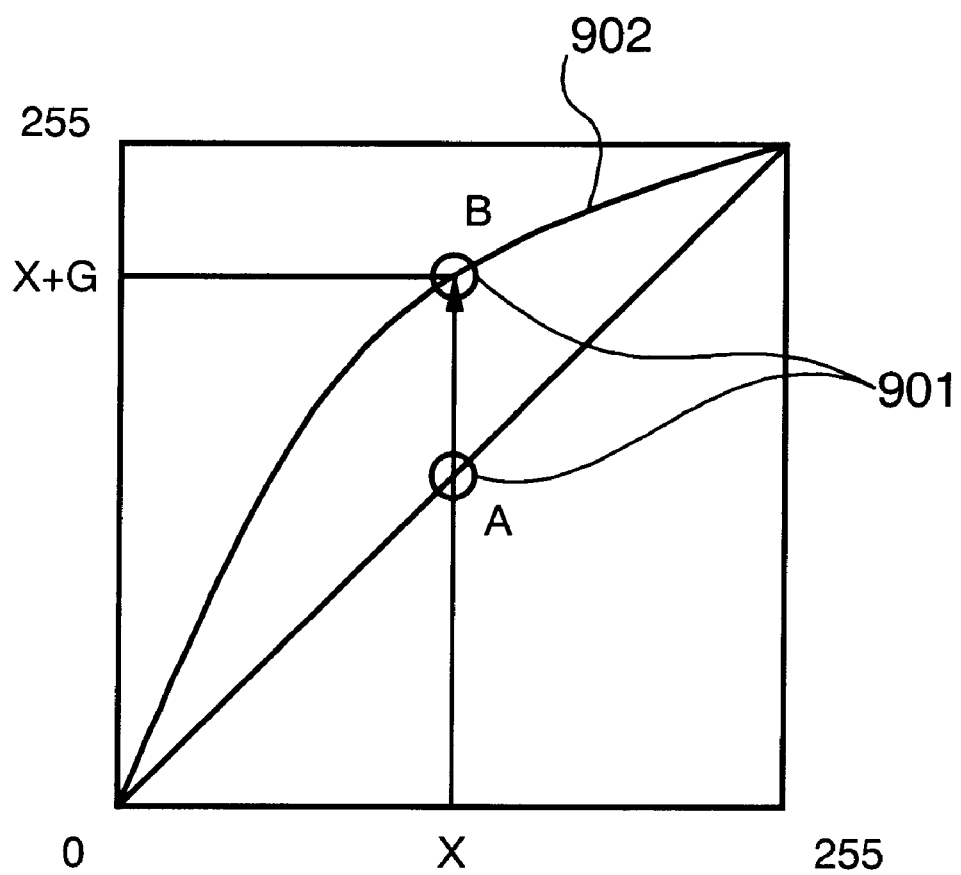
FIG. 9 is an illustration for use in describing a γ correction curve obtained by the control point.

An example of the methods of converting a backlight correction amount G to the γ value requires to prepare a table that shows correspondence between backlight correction amount G and γ value to be used for conversion. Another example is to calculate the γ value in such a manner that an appropriate brightness value X of half tone can be converted into a brightness value (X+G) through the conversion processing. As an example, FIG. 9 shows the curve that is obtained when the control point 60 has changed from A to B. If the half tone parameter represents n control points (x1, x2, x3 . . . ) on the spline curve, a curve can be obtained by performing spline interpolation on the respective control points.

Figures 12, 13:
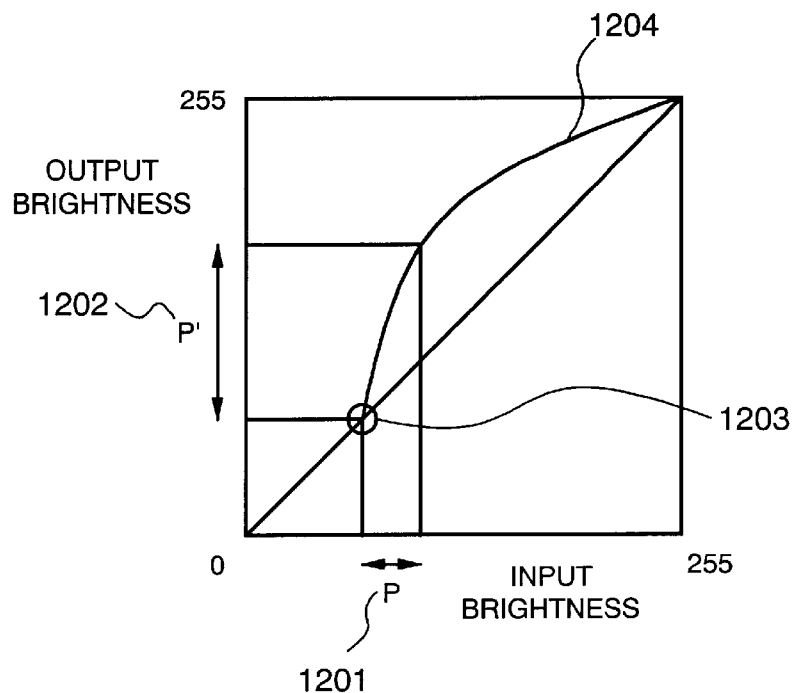
FIG. 12 is an illustration for use in describing a conversion characteristic of the backlight correction table generated by the embodiment.
FIG. 13 is a view showing an example of a look-up table.
Figure 14:
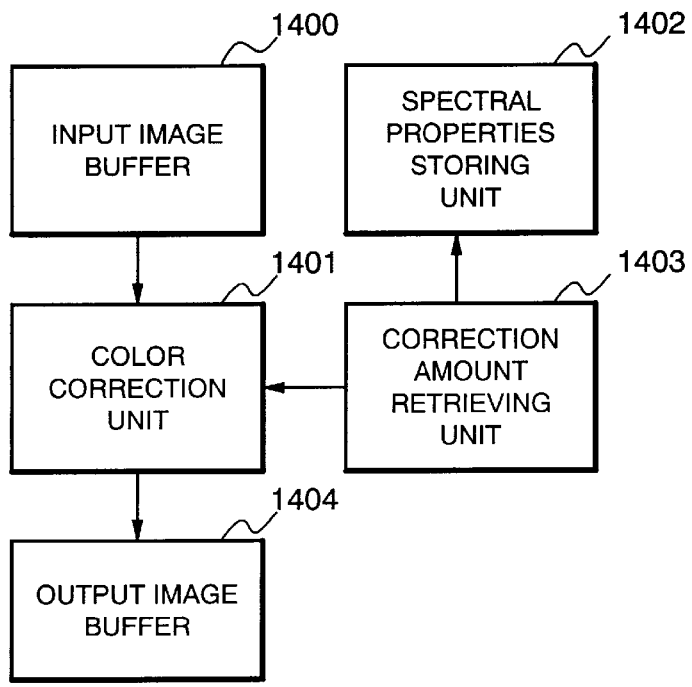
FIG. 14 is a block diagram showing a constitution of the conventional image processing system for correcting the color fog of an image.
Figure 15:
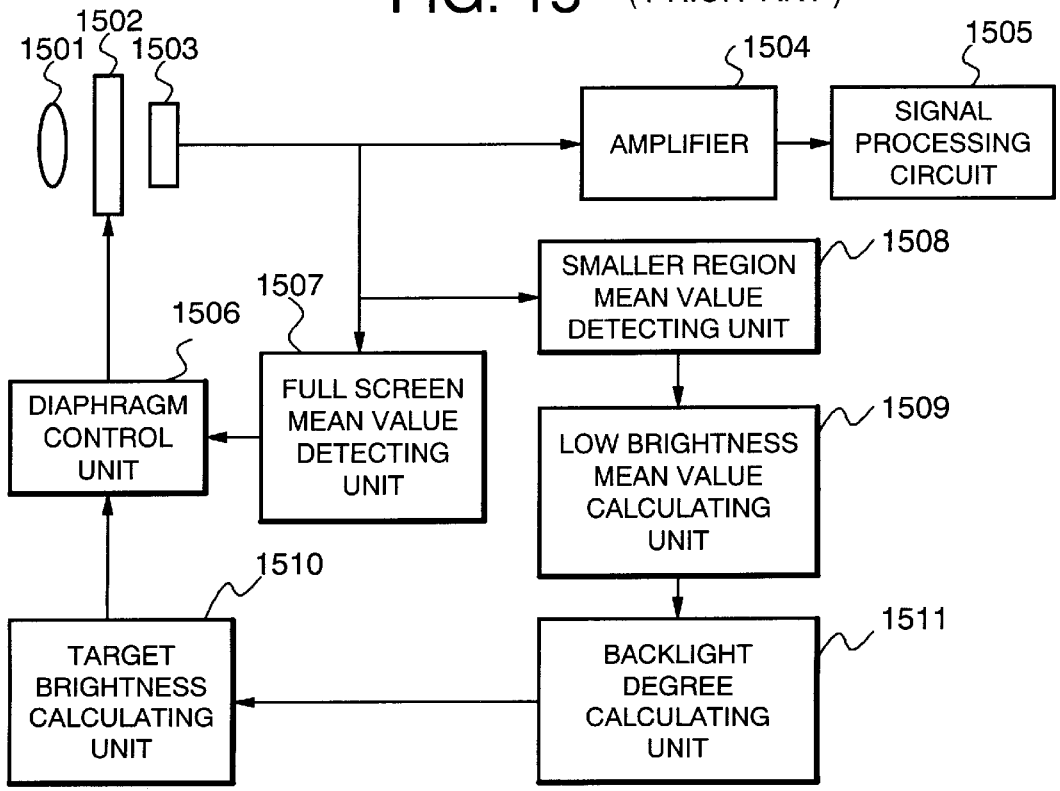
FIG. 15 is a block diagram showing a constitution of the conventional image processing system for performing the backlight correction of an image.
Figure 16:
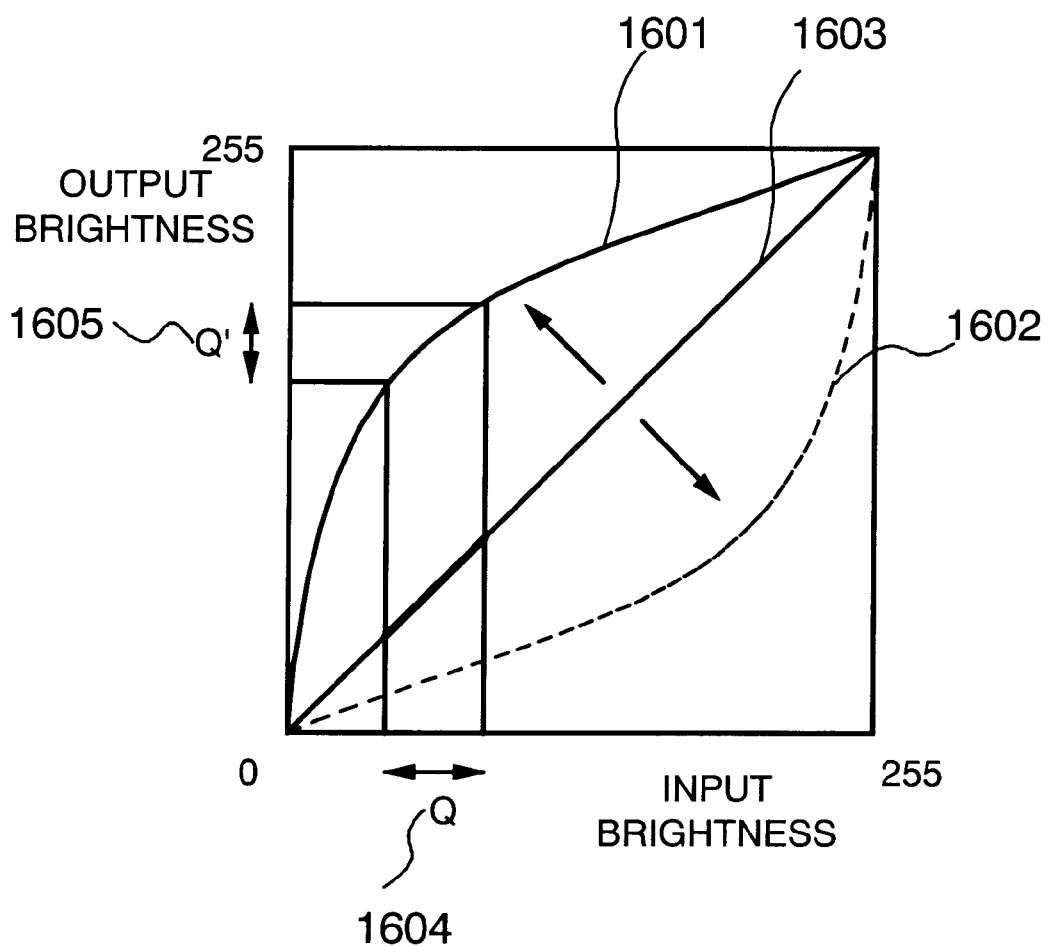
FIG. 16 is a view for use in describing a conversion characteristic according to a γ correction.

Next, a backlight correction table is generated by use of the shadow region brightness value extracted in Step 1001 (Step 1005). FIG. 12 shows an example of backlight correction table. According to the characteristic 1204 in the backlight correction table, the input and output from the brightness 0 to the shadow region brightness value 1203 are the same. The brightness increases gradually starting at the shadow region brightness value 1203, and the input and output become the same again when the brightness is maximum.

Following is an example of calculation to obtain the characteristic 1204 of the backlight correction table. Assuming that the characteristic of the first conversion table above is:

$$Y' = f(Y) \tag{14}$$

the characteristic 1204 of the backlight correction table can be expressed in the expressions (15), (16), and (17), as follows. Here, the brightness value Y of an image is assumed to be between 0 and 255, and the brightness value after conversion is represented by F(Y):

(When Y<Low)

$$F(Y) = Y \quad (15)$$

(When y>Low)

$$F(Y) = \frac{(255 - Low)}{255} \times f(g(Y)) + Low \quad (16)$$

$$G(Y) = \frac{255}{(255 - Low)} \times (Y - Low) \quad (17)$$

As shown in FIG. 11, the characteristic 1102 of the backlight correction table has a characteristic which is similar to the results that are obtained by mapping the Y'=f(Y) curve, as shown by the characteristic 1101 of the first conversion table, to the range from (Low, Low) to (255,255).

Generally speaking, since the input backlight portion 1201 is distributed in the vicinity of the shadow region brightness value, intensifying the contrast in this region leads to an improvement in image quality. The characteristic 1204 of the backlight correction table shown in FIG. 12 indicates that the input backlight portion 1201 is converted to the output backlight portion 1202, constantly intensifying the contrast in the backlight portion.

Finally, the backlight correction table thus obtained is stored as the lookup table (LUT 1300 shown in FIG. 13), which is then used for color-converting of all the pixel values (Step 1006).

Figure 7:
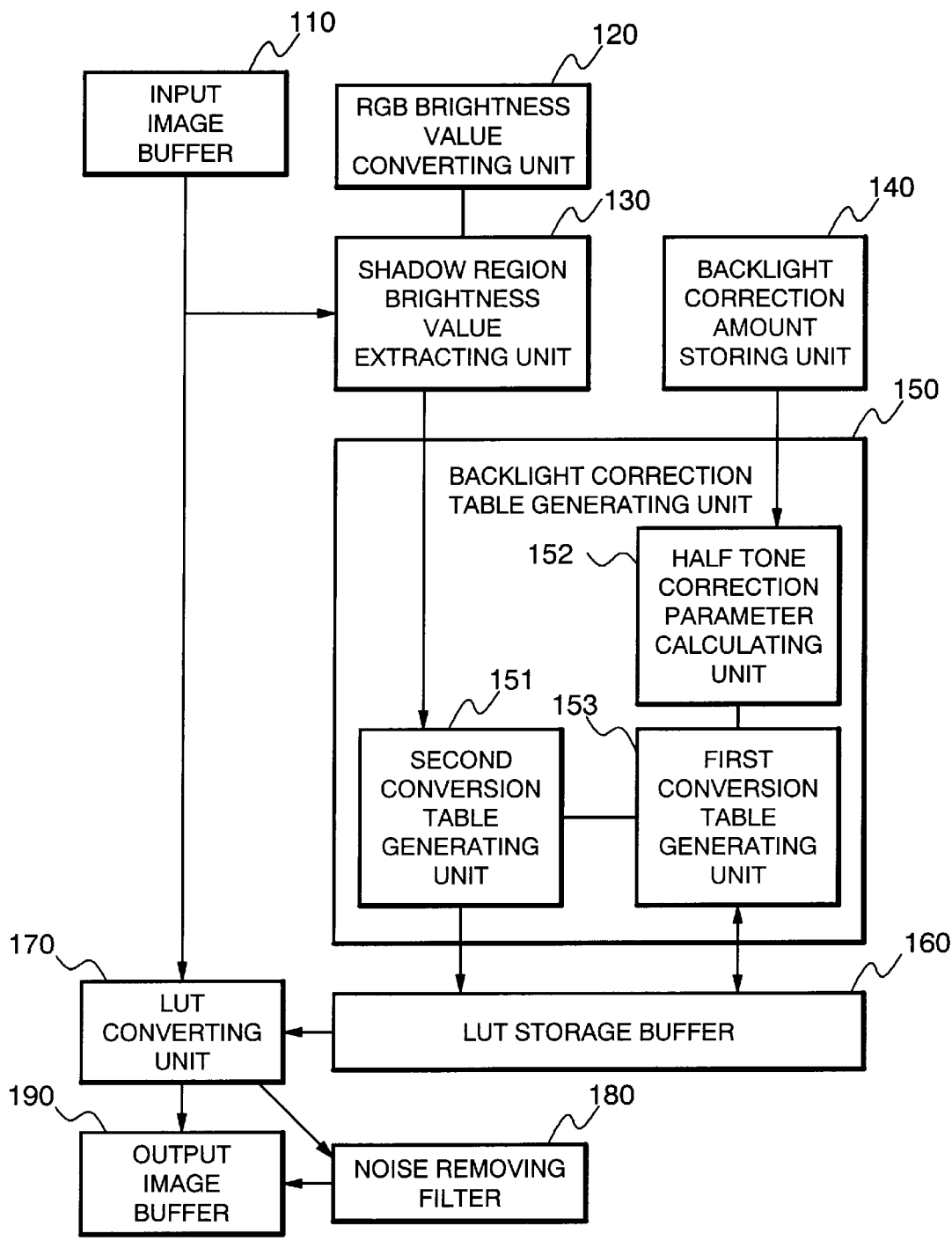
FIG. 7 is a block diagram showing a constitution of an image processing system according to another embodiment of the present invention.

FIG. 7 is a block diagram showing a constitution of an image processing system that implements the backlight correction as described above.

With reference to FIG. 7, the image processing system of the embodiment includes an input image buffer 110 for holding input image data, an RGB brightness value converting unit 120 for calculating the brightness value from the RGB value, a shadow region brightness value extracting unit 130 for extracting the brightness value of the shadow region from an image, a backlight correction amount storing unit 140 for storing the backlight correction amount, a backlight correction table generating unit 150 for generating a backlight correction table on the basis of the backlight correction amount and the shadow region brightness value, an LUT storing buffer 160 for storing the conversion table, an LUT converting unit 170 for performing lookup table conversion on an image, an output image buffer 190 for holding an output image, and a noise removing filter 180. The backlight correction table generating unit 150 includes a half tone correction parameter calculating unit 152 for calculating the γ value from the backlight correction amount as a half tone correction parameter, a first conversion table generating unit 153 for generating the first conversion table on the basis of the γ value thus calculated, and a second conversion table generating unit 151 for generating the backlight correction table on the basis of the shadow region brightness value and the first conversion table. FIG. 7 shows the characteristic components of the embodiment only, and the other general components are not shown therein. It is needless to say that the system includes further components for executing other smoothing operations, including color fog correction described above, and other components for executing other processing.

Figure 8:
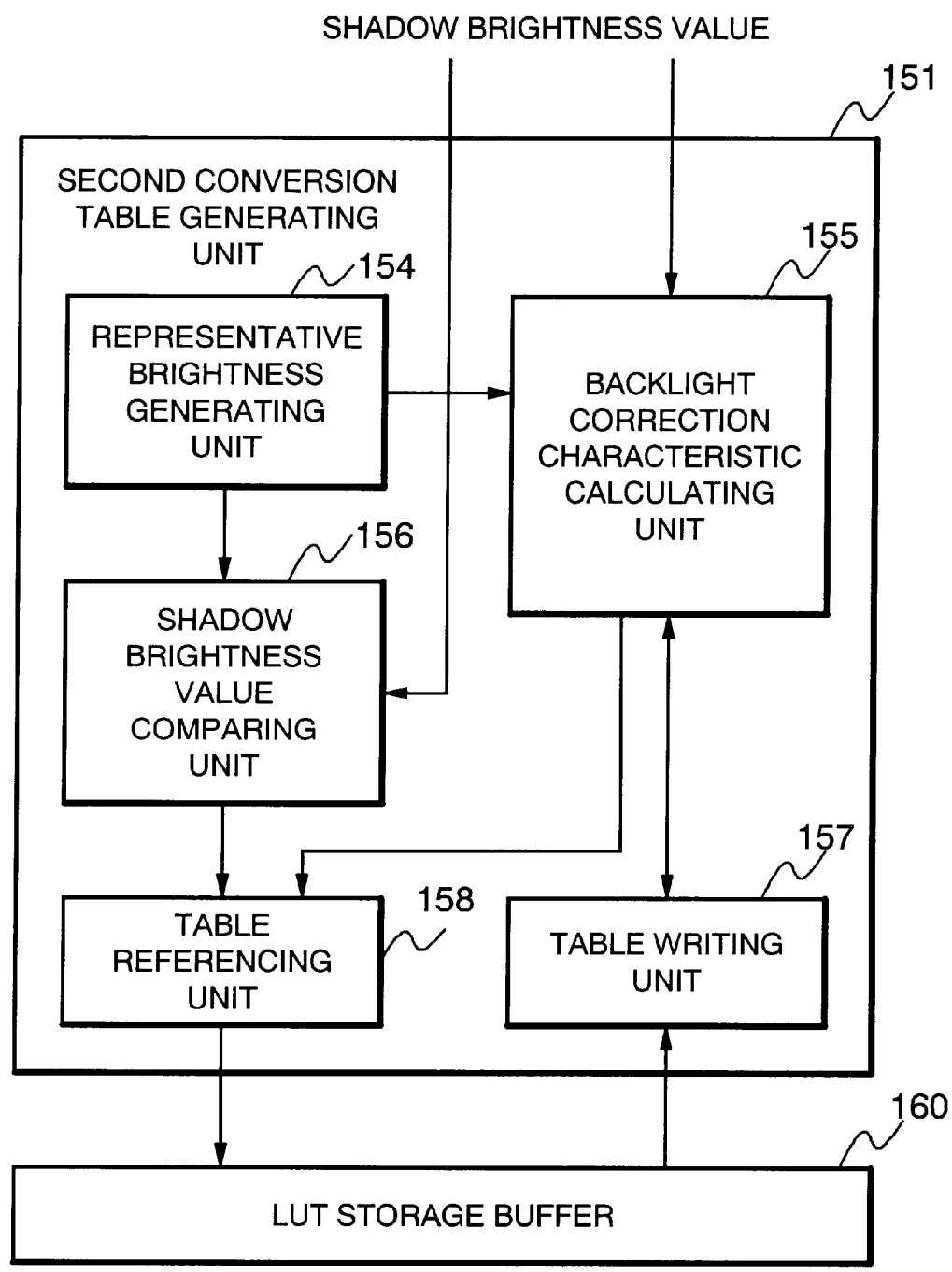
FIG. 8 is a block diagram showing a constitution of a second conversion table generating unit of the embodiment.

FIG. 8 is a block diagram showing a constitution of the second conversion table generating unit 151 of the backlight correction table generating unit 150. As shown in FIG. 8, the second conversion table generating unit 151 includes a representative brightness generating unit 154, a shadow pixel comparing unit 156, a backlight correction characteristic calculating unit 155, a table referencing unit 157, and a table writing unit 158.

In thus constituted image processing system, the shadow region brightness value extracting unit 130 extracts the shadow region brightness value on the basis of the image data input into the input image buffer 110 (Step 1001 in FIG. 10). More specifically, a histogram for brightness data is created by converting the RGB data to brightness data by the RGB brightness value converting unit 120. Alternatively, a histogram may be created by searching an image while obtaining every several pixels instead of searching for all the pixels, for faster histogram calculation. Next, from the histogram thus obtained, the brightness value of the pixel having the lowest brightness in the image is extracted as the shadow region brightness value. As described above, it is also possible that, by regarding the number of pixels equaling α% of all as Na, the pixel having the Na-th lowest brightness value may be output as the shadow region brightness value.

After the correction amount is input into the backlight correction amount storing unit 140 by the operator (Step 1002), the backlight correction table generating unit 150 calculates the backlight correction table using the extracted shadow region brightness value and the input backlight correction amount (Step 1003 to 1005), and inputs the results into the LUT storing buffer 160. In the backlight correction table generating unit 150, the half tone correction parameter calculating unit 152 first calculates the half tone correction parameter using the backlight correction amount (Step 1003).

When calculating the γ value as the half tone parameter, the half tone parameter calculating unit 152 can store the table showing correspondence between backlight correction amount G and γ value in the memory beforehand as described above, and refer to the table to determine the γ value according to the input or otherwise calculate the γ value by assuming such γ correction that will allow an appropriate brightness value X of half tone to be converted to the brightness value (X+G). When calculating the spline control points as the half tone parameter, this unit can store in the memory beforehand the table showing correspondence between backlight correction amount G and n control points, and refer to the table to determine the control points according to the input.

The first table generating unit 153 generates a correction curve using the half tone parameter obtained by calculation, and stores it in the LUT storing buffer 160 (Step 1004). Similarly to the LUT 1300 as shown in FIG. 13, the LUT storing buffer 160 can store data as the combinations of input brightness Y and output brightness F (Y). When the half tone parameter is the γ value, a γ correction curve is generated and stored in the LUT storing buffer 160. When the half tone parameter is the spline control points, a correction curve is generated by performing spline interpolation using the control points and stored in the LUT storing buffer 160.

The second conversion table generating unit 151 generates a final backlight correction table using the shadow brightness value and the data of the correction curve stored in the LUT storing buffer 160 and stores it in the LUT storing buffer 160 (Step 106).

Next, generation of the backlight correction table by the second conversion table generating unit 151 is described in detail.

As described above, the second conversion table generating unit 151 includes a representative brightness generating unit 154, a shadow pixel comparing unit 156, a backlight correction characteristic calculating unit 155, a table writing unit 158, and a table referencing unit 157. First, as the representative brightness to be stored in the LUT, the representative generating unit 154 generates the brightness value Y by incrementing by 1 from 0 until the maximum value of brightness is reached. Then, the shadow pixel comparing unit 156 compares the brightness value Y and the shadow pixel value Low. When Y is smaller than Low, the table writing unit 158 stores the Y value as is at the predetermined address in the LUT storing buffer 160. When Y is greater than Low, the backlight correction characteristic calculating unit 155 calculates the value after backlight correction concerning Y and Low.

The backlight correction characteristic calculating unit 155 calculates the value after backlight correction on the basis of the brightness value Y and the shadow region brightness value Low, using the above-mentioned expressions (16) and (17). More specifically, first g(Y) is calculated using the expression (17), and next the brightness value F(Y) after backlight correction is calculated using the expression (16). The expressions (17) and (18) can be obtained easily by combining a subtracting means, a multiplying means, and a dividing means. In this operation, f(Y) is referenced by the table referencing unit 157 and the LUT storing buffer 160. This f(Y) represents the result of conversion by the first conversion table conversion table that is already stored in the LUT storing buffer 160.

F(Y) thus obtained as mentioned above is stored in the predetermined address in the LUT buffer 160 by the table writing unit 158.

After the backlight correction table is stored in the LUT storing buffer 160, the LUT converting unit 170 reads the RGB image data sequentially, and performs the conversion on the data of each component of the RGB with reference to the table of the corresponding component stored in the LUT storing buffer 160 (Step 1006). The values of the data after table conversion are stored in the output image buffer 190.

Since backlight correction largely enhances the contrast in the backlight portion, even noise hidden in that portion is enhanced as well occasionally. If this happens, an output of better image quality can be obtained by performing subsequent treatment by the noise removing filter 180. One example of noise removing filter that is effective in subsequent treatment is a median filter. Median filters are generally used for removing granular noise. Noise removal by use of a median filter is performed as follows. First, the neighborhood of pixels is searched and a histogram of brightness values of the neighborhood pixels is prepared. A value that represents the median is obtained from the histogram, which is adopted as the new value of pixel.

As described heretofore, the image processing system of the present invention does not correct pixels in the range between the brightness value 0 and the shadow region brightness value. Instead, it uses a tone curve that rises with the shadow region as its starting point, thereby achieving a feature that corrects halftone pixels having greater brightness value than the shadow region brightness value to a greater brightness. By this, this system provides the advantageous capability of correcting backlight without reducing contrast.

The system is also effective in increasing the quality of output images by incorporating a noise removing filter.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An image processing system which conducts necessary correction processing on digital image data, comprising:

correction pattern storing means for storing correction patterns set corresponding to kinds of color fogs;

correction pattern selecting means for selecting said correction pattern suitable for correction of an input image among said correction patterns stored in said correction pattern storing means through the operation of an operator;

correction amount storing means for storing a correction amount indicative of an appropriate degree of correction on color fog;

tone curve generating means for generating a tone curve of RGB based on said correction pattern selected by said correction pattern selecting means and said correction amount stored in said correction amount storing means; and LUT converting means for performing table conversion on image data of said input image based on said tone curve generated by said tone curve generating means to conduct color conversion processing of all the pixels of image data, and wherein said tone curve generating means comprises:

highlight control amount calculating means for calculating a control amount of a highlight region in each component of RGB based on said correction pattern and said correction amount, half tone control amount calculating means for calculating a control amount of a half tone region in each component of RGB based on said correction pattern and said correction amount, shadow control amount calculating means for calculating a control amount of a shadow region in each component of RGB based on said correction pattern and said correction amount, tone curve calculating means for calculating said tone curve of each component of RGB based on the three kinds of control amounts calculated by said three kinds of control amount calculating means, a straight line generating means for use in the tone curve calculating processing by said tone curve calculating means to conduct straight line interpolation between a control point in a high brightness region and a control point in a low brightness region, and a curve generating means for use in the tone curve calculating processing by said tone curve calculating means to conduct curve interpolation for smoothly interpolating between a control point in a half tone region and starting points on the high brightness side and the low brightness side.

2. Digital image data correcting method in an image processing system which conducts necessary correction processing on digital image data, comprising the steps of:

among correction patterns set corresponding to kinds of color fogs, selecting said correction pattern suitable for correction of an input image by the operation of an operator;

obtaining a correction amount indicative of an appropriate degree of correction on color fog;

generating a tone curve of RGB based on said correction pattern selected at said correction pattern selecting step and said correction amount obtained at said correction amount obtaining step; and performing table conversion on image data of said input image according to said tone curve generated at said tone curve generating step to conduct color conversion of all pixels of the image data, and wherein said tone curve generating step comprises the steps of:

calculating a control amount of a highlight region in each component of RGB based on said correction pattern and said correction amount, calculating a control amount of a half tone region in each component of RGB based on said correction pattern and said correction amount, calculating a control amount of a shadow region in each component of RGB based on said correction pattern and said correction amount, calculating said tone curve of each component of RGB based on the three kinds of control amounts calculated at each said steps, wherein at the time of calculating a tone curve, said tone curve calculating step performing a straight line generating module for conducting straight line interpolation between a control point in a high brightness region and a control point in a low brightness region, and a curve generating module for conducting curve interpolation for smoothly interpolating between a control point in a half tone region and starting points on the high brightness side and on the low brightness side.

3. A computer readable memory which stores an image processing program for controlling an image processing system which conducts necessary correction processing on digital image data, said image processing program comprising the steps of:

among correction patterns set corresponding to kinds of color fogs, selecting said correction pattern suitable for correction of an input image by the operation of an operator;

obtaining a correction amount indicative of an appropriate degree of correction on color fog, generating a tone curve of RGB based on said correction pattern selected at said correction pattern selecting step and said correction amount obtained at said correction amount obtaining step; and performing table conversion on image data of said input image according to said tone curve generated at said tone curve generating step to conduct color conversion of all pixels of the image data, and wherein said tone curve generating step of said image processing program comprises the steps of:

calculating a control amount of a highlight region in each component of RGB based on said correction pattern and said correction amount, calculating a control amount of a half tone region in each component of RGB based on said correction pattern and said correction amount, calculating a control amount of a shadow region in each component of RGB based on said correction pattern and said correction amount, calculating said tone curve of each component of RGB based on the three kinds of control amounts calculated at each said steps, wherein at the time of calculating a tone curve, said tone curve calculating step performing a straight line generating module for conducting straight line interpolation between a control point in a high brightness region and a control point in a low brightness region, and a curve generating module for conducting curve interpolation for smoothly interpolating between a control point in a half tone region and starting points on the high brightness side and on the low brightness side.

4. An image processing system which conducts necessary correction processing on digital image data, comprising:

correction pattern storing means for storing correction patterns set corresponding to kinds of color fogs;

correction pattern selecting means for selecting said correction pattern suitable for correction of an input image among said correction patterns stored in said correction pattern storing means through the operation of an operator;

correction amount storing means for storing a correction amount indicative of an appropriate degree of correction on color fog;

tone curve generating means for generating a tone curve of RGB based on said correction pattern selected by said correction pattern selecting means and said correction amount stored in said correction amount storing means; and LUT converting means for performing table conversion on image data of said input image based on said tone curve generated by said tone curve generating means to conduct color conversion processing of all the pixels of image data, and wherein said tone curve generating means comprises:

tone curve calculating means for calculating said tone curve of each component of RGB, a straight line generating means for use in the tone curve calculating processing by said tone curve calculating means to conduct straight line interpolation between a control point in a high brightness region and a control point in a low brightness region, and a curve generating means for use in the tone curve calculating processing by said tone curve calculating means to conduct curve interpolation for smoothly interpolating between a control point in a half tone region and starting point on the high brightness side and the low brightness side.

5. Digital image data correcting method in an image processing system which conducts necessary correction processing on digital image data, comprising the steps of:

among correction patterns set corresponding to kinds of color fogs, selecting said correction pattern suitable for correction of an input image by the operation of an operator;

obtaining a correction amount indicative of an appropriate degree of correction on color fog;

generating a tone curve of RGB based on said correction pattern selected at said correction pattern selecting step and said correction amount obtained at said correction amount obtaining step; and performing table conversion on image data of said input image according to said tone curve generated at said tone curve generating step to conduct color conversion of all pixels of the image data, and wherein said tone curve generating step comprises the step of:
calculating said tone curve of each component of RGB, wherein at the time of calculating a tone curve, said tone curve calculating step performing
a straight line generating module for conducting straight line interpolation between a control point in a high brightness region and a control point in a low brightness region, and
a curve generating module for conducting curve interpolation for smoothly interpolating between a control point in a half tone region and starting points on the high brightness side and on the low brightness side.

6. A computer readable memory which stores an image processing program for controlling an image processing system which conducts necessary correction processing on digital image data, said image processing program comprising the steps of:

among correction patterns set corresponding to kinds of color fogs, selecting said correction pattern suitable for correction of an input image by the operation of an operator;

obtaining a correction amount indicative of an appropriate degree of correction on color fog, generating a tone curve of RGB based on said correction pattern selected at said correction pattern selecting step and said correction amount obtained at said correction amount obtaining step; and performing table conversion on image data of said input image according to said tone curve generated at said tone curve generating step to conduct color conversion of all pixels of the image data, and wherein said tone curve generating step of said image processing program comprises the step of:
calculating said tone curve of each component of RGB, wherein at the time of calculating a tone curve, said tone curve calculating step performing
a straight line generating module for conducting straight line interpolation between a control point in a high brightness region and a control point in a low brightness region, and
a curve generating module for conducting curve interpolation for smoothly interpolating between a control point in a half tone region and starting points on the high brightness side and on the low brightness side.

* * * * *